Patented Feb. 3, 1931

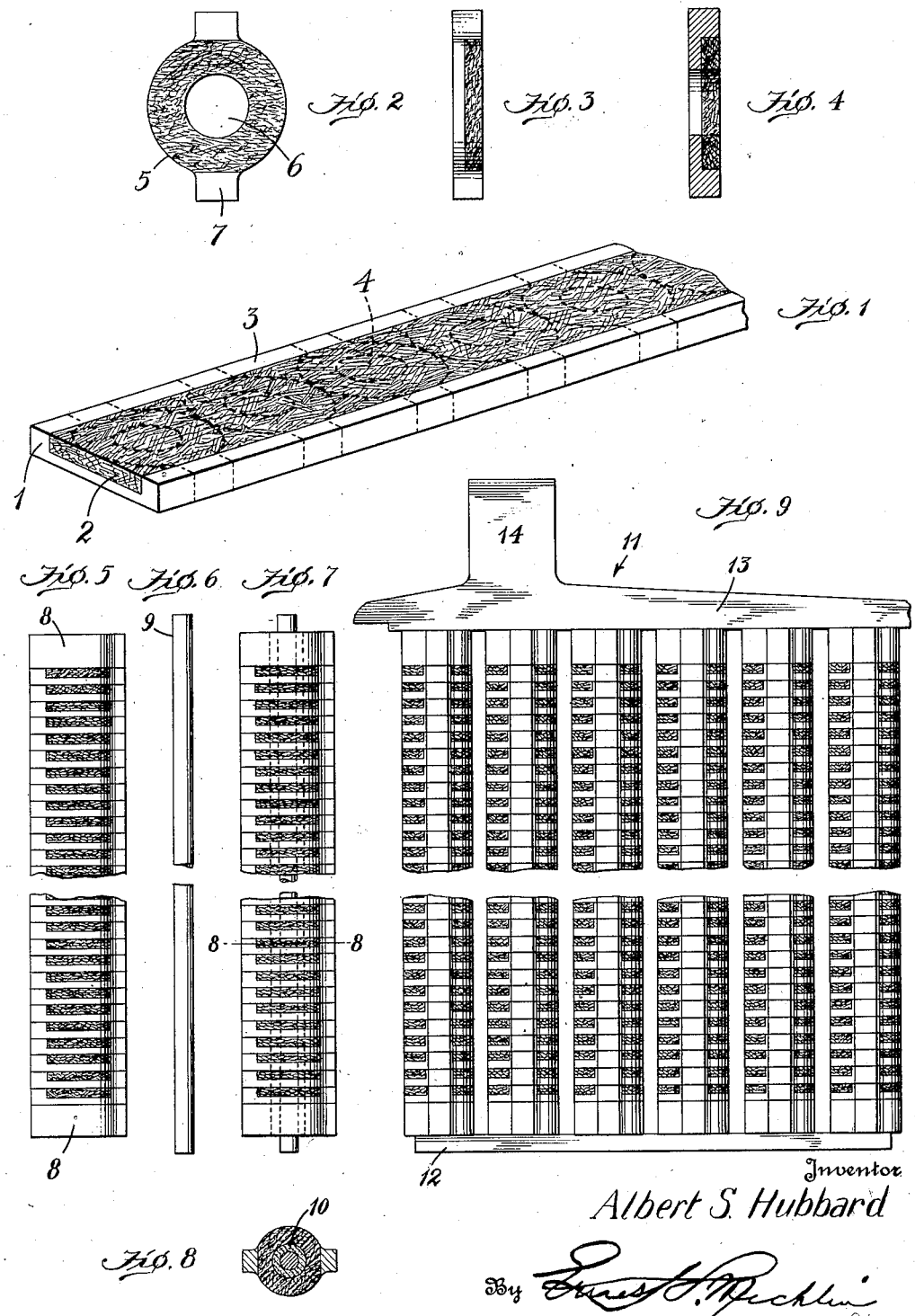
Feb. 3, 1931. A. S. HUBBARD 1,791,208
BATTERY PLATE
Filed Aug. 12, 1927

1,791,208

UNITED STATES PATENT OFFICE

ALBERT S. HUBBARD, OF BETHEL, CONNECTICUT, ASSIGNOR, BY MESNE ASSIGNMENTS, TO GOULD STORAGE BATTERY CORPORATION, OF DEPEW, NEW YORK, A CORPORATION OF DELAWARE

BATTERY PLATE

Application filed August 12, 1927. Serial No. 212,547.

This invention relates to secondary battery or accumulator plates or electrodes.

The principal object of the invention, generally stated, is to provide a novel electrode, or so-called plate, constructed as a species of container or series of containers for the active material, the electrode or plate being of cellular form with the active material enclosed and retained within the compartments, pockets or tubular recesses.

An important object of the invention is to provide mechanical means for retaining the active material within the electrode or plate and, more specifically, within the series of compartments or containers.

Another object of the invention is to provide a construction wherein the porosity of the container-like plate or electrode may be varied either initially, during preparation, or during the service of the battery.

More specifically, an important object is to provide a battery plate formed as a series of tubular containers within which the active material is retained, the containers being constructed in a peculiar and novel manner from specially prepared and treated insulating material so as to obtain the desired results.

An additional object of the invention is to provide a container-like plate structure which, while possessing the above mentioned characteristics, will be simple and inexpensive to manufacture and assemble, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawing in which:

Figure 1 is a perspective view showing a sheet of insulating material formed or constructed in accordance with the invention, this view having applied thereto dotted lines indicating the cutting of the washer-like pieces therefrom, Figure 2 is a plan view of one of the washer-like members, Figure 3 is an edge view thereof, Figure 4 is a cross section therethrough, Figure 5 is an elevation of a stack of the washer members arranged to form a container, Figure 6 is an elevation of the core for the active material, Figure 7 is a side elevation of a stack forming one container, this view showing the core and active material in place, Figure 8 is a detail cross section taken on the line 8—8 of Figure 7, and Figure 9 is a side elevation of the complete plate or electrode in fully assembled condition.

In the carrying out of the invention, I preferably prepare the material for the construction of the plate as follows:

Incompletely cured stock of hard rubber or other suitable insulating material is pressed or rolled out to the required thickness and upon the sheet or strip thus obtained are placed suitable strips or layers of porous material such as cotton cloth, wood veneer, felt or the like, and the compound sheet is then again pressed or rolled to embed such porous material in the insulating material, thus obtaining the sheet of material illustrated in Figure 1 wherein the numeral 1 designates the rubber or other insulating material within which is embedded the porous material 2. It will be noted that regardless of whether this sheet or strip be formed as a single unit, as illustrated, or whether it be constructed as a plurality of such units, the porous material does not extend to the edges, the marginal portions 3 being of the solid hard rubber or other stock. If the compound sheet be formed of large size or in multiples of what is disclosed in Figure 1, it is apparent that the porous portions 2 would be located in spaced relation separated by portions formed of the original hard rubber or other stock alone.

The compound sheet of Figure 1 is then passed through a die or series of dies which stamp out washer-like members as shown by the dotted lines 4 in Figure 1. These washer members are shown in detail in Figures 2, 3 and 4 and comprise disk-like bodies 5 having central openings 6 and laterally extending diametrically opposite lugs 7. These washer members are stacked as shown in Figure 5 with solid buttons or washers 8 at the top and bottom, and are placed within a suitable mold or holder and cured by vulcanizing, pressure being applied to cause the projecting lugs to become joined, forming a continuous frame of a homogeneous nature. When the washer members are thus stacked it is of course apparent that the central openings 6 therein will register one with another and form a tubular passage.

After vulcanization, a conducting core 9 coated with or embedded in active material 10 is inserted within the tubular opening in the finished stack, the ends of the core projecting beyond the ends of the container formed by the stack as disclosed in Figure 7. Any desired number of containers or units may be made as set forth above and as many as necessary are used to form a complete plate such as that illustrated in Figure 9 wherein I have shown a plate indicated generally at 11 comprising six of the containers made as described and arranged in spaced parallel relation, the projecting ends of the cores 9 being connected at the bottom of the plate by a conducting bar, strip or the like 12 and the projecting ends at the top being connected by a bar 13 having a terminal lug 14 thereon as is the customary practice in storage battery construction. It is probably immaterial exactly what metal is used to form the conducting cores and the bars 12 and 13 and it is also immaterial how the bars are connected with or secured to the cores though a convenient plan is to cast the bars in place. After any desired number of plates have been constructed as shown and described they may be assembled in the proper relation to form a storage battery. It is of course obvious that a single container formed as described may be used to constitute a plate for a very small capacity battery.

In order to vary, adjust or determine the porosity of the material from which the stack forming washers are made, I may use a material, part of the structure or one or more of the ingredients of which may be dissolved or otherwise dissipated before, after or during vulcanization or other treatment of the stack, by the effect of the active material upon the insulating material after assembly, or by the action of the electrolyte placed in the battery of which the plates constructed as indicated form a part. It is not believed necessary to set forth what these ingredients may be or what the structure may be as it is readily conceivable that there may be numerous variations.

From the foregoing description and a study of the drawing it will be apparent that I have thus provided a novel storage battery plate in which the active material is contained within a plurality of containers of insulating material having a regulable porosity. Clearly, as the active material is actually confined within the tubular openings in the containers it will be impossible for it to become dislodged. This and other advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. The method of making a tubular container to form a part of a storage battery plate and to contain a core surrounded by active material, comprising rolling out a sheet of non-porous insulating material, embedding laminæ of porous material therein, cutting the sheet into a plurality of washer-like sections, stacking the sections, and vulcanizing the stack.

2. The method of making a tubular container to form a part of a storage battery plate and to contain a core surrounded by active material, comprising taking a sheet of non-porous insulating material, embedding a layer of porous material therein, cutting the sheet into a plurality of washer-like sections, stacking the sections and securing them together.

3. The method of making a tubular container to form a part of a storage battery plate and to contain a core surrounded by active material, comprising taking a sheet of non-porous insulating material, embedding porous material therein, cutting the sheet into a plurality of washer-like sections with the porous material exposed at the edges thereof, stacking the sections and vulcanizing together the non-porous portions thereof.

4. The method of making a tubular container to form a part of a storage battery, comprising taking a sheet of substantially impervious insulating material, incorporating porous material in one side of the sheet, cutting the sheet into a plurality of washer-like sections with the porous material exposed, stacking the sections and vulcanizing them together.

5. The method of making a tubular container to form part of a storage battery, comprising taking a sheet of substantially impervious insulating material, embedding a mass of porous material therein at one side thereof, cutting the sheet into a plurality of washer-like sections, stacking the sections with the impervious portion of one contacting the porous portion of the next, and securing the sections together outwardly of the porous portions.

6. The method of making a tubular container to form part of a storage battery, comprising taking a sheet of substantially impervious insulating material, embedding a mass of porous material therein at one side thereof, cutting the sheet into a plurality of washer-like sections, stacking the sections with the impervious portion of one contacting the porous portion of the next, and securing the sections together outwardly of the porous portions by vulcanizing.

7. The method of making a tubular container to form part of a storage battery, comprising taking a sheet of rubber, embedding therein at one side thereof a layer of porous material, cutting the sheet into a plurality of washer-like sections, stacking the sections and vulcanizing them together.

8. The method of making a tubular container to form part of a storage battery, comprising taking a sheet of rubber, embedding in one side thereof a layer of porous material in spaced relation to the edges, cutting the sheet into a plurality of washer-like sections, stacking the sections and securing them together outwardly of the porous portion.

In testimony whereof I affix my signature.

ALBERT S. HUBBARD.